United States Patent
Yan et al.

(12) 
(10) Patent No.: US 12,264,385 B2
(45) Date of Patent: Apr. 1, 2025

(54) HIGH-ENTROPY ALLOY COATING AND PREPARATION METHOD AND USE THEREOF

(71) Applicant: Institute of New Materials, Guangdong Academy of Sciences, Guangdong (CN)

(72) Inventors: Xingchen Yan, Guangdong (CN); Cheng Chang, Guangdong (CN); Bingwen Lu, Guangdong (CN); Changguang Deng, Guangdong (CN); Min Liu, Guangdong (CN)

(73) Assignee: Institute of New Materials, Guangdong Academy of Sciences, Guangzhou (CN)

( * ) Notice: Subject to any disclaimer, the term of this patent is extended or adjusted under 35 U.S.C. 154(b) by 0 days.

(21) Appl. No.: 17/926,993

(22) PCT Filed: Sep. 30, 2022

(86) PCT No.: PCT/CN2022/123032
§ 371 (c)(1),
(2) Date: Nov. 21, 2022

(87) PCT Pub. No.: WO2023/056890
PCT Pub. Date: Apr. 13, 2023

(65) Prior Publication Data
US 2024/0254599 A1    Aug. 1, 2024

(30) Foreign Application Priority Data
Oct. 8, 2021    (CN) .......................... 202111169864.2

(51) Int. Cl.
| | |
|---|---|
| *C22C 30/00* | (2006.01) |
| *B22F 9/10* | (2006.01) |
| *B23K 26/34* | (2014.01) |
| *B23K 35/30* | (2006.01) |
| *B23K 103/04* | (2006.01) |

(52) U.S. Cl.
CPC ................ *C22C 30/00* (2013.01); *B22F 9/10* (2013.01); *B23K 26/34* (2013.01); *B23K 35/3086* (2013.01); *B23K 2103/04* (2018.08)

(58) Field of Classification Search
CPC ....... C22C 30/00; C22C 1/0433; C22C 19/05; C22C 19/055; C22C 19/056; C22C 19/07; B22F 9/10; B22F 10/25; B22F 10/20; B23K 26/34; B23K 35/3086; B23K 2103/04; B23K 10/027; Y02P 10/25; C23C 24/106; B33Y 10/00; B33Y 70/00
See application file for complete search history.

(56) References Cited

FOREIGN PATENT DOCUMENTS

| | | | | |
|---|---|---|---|---|
| CN | 102776430 A | * | 11/2012 | |
| CN | 106929846 A | * | 7/2017 | ............. C22C 30/00 |
| CN | 107299342 A |   | 10/2017 | |
| CN | 109234601 A |   | 1/2019 | |
| CN | 112553564 A | * | 3/2021 | ............. C22C 30/00 |

OTHER PUBLICATIONS

Li et al., "Effects of Al content on microstructure and wear resistance of AlxCoCrFeNiTi0.5 alloy coating prepared by laser cladding," Transactions of Materials and Heat Treatment, vol. 36, No. 12, Dec. 2015. (Year: 2015).*
English language translation of Li et al., "Effects of Al content on microstructure and wear resistance of AlxCoCrFeNiTi0.5 alloy coating prepared by laser cladding," Transactions of Materials and Heat Treatment, vol. 36, No. 12, Dec. 2015. (Year: 2015).*
Li Zhang et al., Effects of Al content on microstructure and wear resistance of AlxCoCrFeNiTi0. 5 alloy coating prepared by laser cladding, Transactions of Materials and Heat Treatment, Dec. 31, 2015, pp. 185-189, vol. 36, No. 12.

* cited by examiner

*Primary Examiner* — William P Fletcher, III (57) ABSTRACT

Disclosed are a high-entropy alloy (HEA) coating and a preparation method and use thereof. Laser cladding is conducted with an HEA powder to obtain the HEA coating, where the HEA is a FeCoCrNiAl$_{0.5}$Ti$_{0.5}$ alloy, and the HEA includes the following chemical components in atomic percentage: Al: 10.01% to 12.30%, Co: 18.1% to 22.5%, Cr: 18.05% to 20.12%, Fe: 18.77% to 21.02%, Ni: 19.21% to 20.99%, and Ti: 8.43% to 11.5%. The HEA material with high hardness and wear resistance provided by the present disclosure is suitable for laser cladding of a surface of a precision mold, an offshore component, or a drilling rod. A powder is prepared from the above alloy components and then prepared into a corresponding HEA coating with high strength, high hardness, and prominent wear resistance through laser cladding. The material has prominent weldability and is a special nickel-based HEA material suitable for laser additive manufacturing.

10 Claims, 4 Drawing Sheets

HIGH-ENTROPY ALLOY COATING AND PREPARATION METHOD AND USE THEREOF

TECHNICAL FIELD

The present disclosure relates to the technical field of high-performance metal powder materials, and in particular to a high-entropy alloy (HEA) coating and a preparation method and use thereof.

BACKGROUND

The concept of HEA is a brand-new alloy design concept proposed in recent years. Unlike the conventional alloys with a single principal element or two principal elements, an HEA is usually composed of 5 or more elements that each have a content of 5% to 35%. The most common class of HEAs are those with elements mixed in equal molar proportions. This alloy design method will fully increase the entropy value of an alloy system, and thus a resulting alloy is called HEA. HEAs have a range of excellent properties, such as high hardness, wear resistance, and corrosion resistance.

Key components such as large molds and offshore components are indispensable tools and constituents in modern large-scale industrial production. However, due to repeated friction, large-load impact, liquid corrosion, or the like, stamping dies and offshore components often produce cyclic softening, surface etching pits, and micro-cracks during the actual service. Therefore, it is necessary to manufacture high-performance coatings with uniform thickness, high hardness, and wear resistance on surfaces of stamping dies and offshore components, which puts forward urgent needs for raw materials and corresponding technologies required by the surface treatment.

At present, the preparation methods of HEA coatings mainly include mechanical alloying, magnetron sputtering, thermal spraying, electrochemical deposition, laser cladding, or the like. The laser cladding technology has advantages over other technologies such as automatic preparation process, wide cladding layer material selection range, metallurgical binding between a coating and a substrate, dense and ultra-fine microstructure, low dilution rate, small size limitation, and is expected to become one of the main preparation methods for large-scale promotion and application of HEAs. The laser cladding technology has become one of the hot research directions in the field of HEAs within the manufacturing community. However, the types and specific components of HEAs suitable for laser cladding have not yet been understood clearly, especially the raw materials and related processes of the laser cladding for producing the HEA coatings with high hardness and wear resistance on surfaces of some heavy load-bearing molds and key offshore components.

In view of this, the present disclosure is specifically proposed.

SUMMARY

An objective of the present disclosure is to overcome the defects in the prior art and provide an HEA coating and a preparation method and use thereof.

The present disclosure is implemented as follows:

In a first aspect, the present disclosure provides an HEA, where the HEA is a FeCoCrNiAl$_{0.5}$Ti$_{0.5}$ alloy and the HEA includes the following chemical components in atomic percentage: Fe: 15% to 25%, Co: 15% to 25%, Ni: 15% to 25%, Cr: 15% to 25%, Al: 5% to 15%, and Ti: 5% to 15%.

In a second aspect, the present disclosure also provides a preparation method of the HEA, including: using a plasma rotating electrode process to fabricate the HEA powder.

In a third aspect, the present disclosure also provides use of the HEA in the manufacture of an HEA coating or alloy.

The HEA powder is preferably used for laser additive manufacturing to prepare an HEA alloy and is more preferably used for laser cladding to prepare an HEA coating.

In a fourth aspect, the present disclosure also provides a preparation method of an HEA coating, including: using the HEA powder to produce the HEA coating.

Preferably, a method for preparing the HEA coating is at least one selected from the group consisting of magnetron sputtering, electron beam-physical vapor deposition (EB-PVD), arc ion plating (AIP), flame spray coating, atmospheric plasma spraying, vacuum plasma spraying (VPS), cold spraying, plasma spray-physical vapor deposition (PS-PVD), pulse plating, and laser cladding, is preferably laser additive manufacturing, and is more preferably laser cladding.

Preferably, the HEA is a FeCoCrNiAl$_{0.5}$Ti$_{0.5}$ alloy, and the HEA includes the following chemical components in atomic percentage: Al: 10.01% to 12.30%, Co: 18.1% to 22.5%, Cr: 18.05% to 20.12%, Fe: 18.77% to 21.02%, Ni: 19.21% to 20.99%, and Ti: 8.43% to 11.5%;

the laser cladding is conducted with a laser power of 1,800 W to 2,400 W, a scanning speed of 300 mm/min to 800 mm/min, a lapping ratio of 50% to 70%, and a powder feeding speed of 4 rpm to 6 rpm;

an HEA powder suitable for the laser cladding has a particle size of 90 μm to 108 μm; and the HEA powder is prepared through the following steps: forging a consumable electrode rod from raw materials, melting a surface of the consumable electrode rod with a plasma gun, while spinning the rod under an action of high-speed rotary centrifugation to obtain tiny droplets, cooling the tiny droplets into a spherical powder, and collecting to acquire the HEA powder, wherein the plasma gun is used for melting with a flame temperature of the plasma gun maintained at 1,650° C. or higher to ensure the fully melt of the HEA rods.

In a fifth aspect, the present disclosure also provides a high-performance coating prepared via laser cladding technology.

Preferably, when the laser cladding substrate is AISI 45 steel, the laser cladded coating metallurgically binds to the substrate, and has a microhardness as high as 700 to 770 HV$_{0.2}$ that is 2.3 to 2.5 times a microhardness of the substrate, and an average wear rate of $5.21 \times 10^{-5}$ mm$^3$/(N·m) to $9.18 \times 10^{-5}$ mm$^3$/(N·m).

In a sixth aspect, the present disclosure also provides use of the laser cladded coating in a material with high hardness and wear resistance.

Preferably, the laser cladded coating is used for high hardness and wear resistance materials of heavy load-bearing, large impact components in the fields of stamping dies, petrochemical industry, marine engineering, and agricultural machinery.

More preferably, the laser cladded coating is used for a material with high hardness and wear resistance on a surface of a precision mold, an offshore component, or a drilling rod.

The present disclosure has the following beneficial effects:

Among the elements added in the HEA material prepared by the present disclosure, Ni and Co have excellent toughness, and Co, Cr have prominent high-temperature resistance alongside with favorable corrosion resistance, which can effectively improve the high-temperature resistance and corrosion resistance of the material while ensuring the plasticity and toughness of the material. The HEA material also includes Al and Ti, which reduces the density of the material while promoting its oxidation resistance and hardness, thereby enabling the properties of light weight, high hardness, and high strength. With the HEA powder, a corresponding HEA coating with high strength, high hardness, and prominent wear resistance can be prepared through laser cladding. The HEA material prepared by the present disclosure is a special HEA powder material that has excellent weldability and is suitable for laser additive manufacturing, which expands the use scope of the material in the field of additive manufacturing.

BRIEF DESCRIPTION OF THE DRAWINGS

To describe the technical solutions in the examples of the present disclosure more clearly, the accompanying drawings required for describing the examples are briefly described below. It should be understood that the following accompanying drawings show merely some examples of the present disclosure, and thus should not be regarded as a limitation to the scope. A person of ordinary skill in the art may still derive other related drawings from these accompanying drawings without creative efforts.

DETAILED DESCRIPTION

To make the objectives, technical solutions, and advantages of the examples of the present disclosure clearer, the technical solutions in the examples of the present disclosure will be described clearly and completely below. If no specific conditions are specified in the examples, the examples will be implemented under conventional conditions or the conditions recommended by the manufacturer. All of the used reagents or instruments which are not specified with manufacturers are conventional commercially-available products.

An objective of the present disclosure is to develop a wear-resistant HEA material specially for laser additive manufacturing of the heavy load-bearing and large-impact components in fields of stamping dies, petrochemical industry, and drilling rods and to provide a method for rapidly preparing the HEA material, thereby achieving the purpose of improving the mechanical properties such as strength, hardness, and wear resistance.

In order to meet the material and structure conditions of precision molds and key offshore components, a novel HEA material with high hardness, excellent strength, and excellent wear resistance is prepared. In an embodiment of the present disclosure, a novel HEA powder suitable for laser cladding is developed, and a corresponding laser cladding method is provided, which achieves the rapid fabrication of a coating on the surface of some complicated structural parts while improving the strength, hardness, and wear resistance of them.

To achieve the above objective, the present disclosure adopts the following technical solutions:

In a first aspect, an embodiment of the present disclosure provides an HEA, where the HEA is $FeCoCrNiAl_{0.5}Ti_{0.5}$ and the HEA includes the following chemical components in atomic percentage: Fc: 15% to 25%, Co: 15% to 25%, Ni: 15% to 25%, Cr: 15% to 25%, Al: 5% to 15%, and Ti: 5% to 15%.

Among the elements added in the HEA material provided in an embodiment of the present disclosure, Ni and Co have excellent toughness, and Co, Cr possess prominent high-temperature resistance alongside with favorable corrosion resistance, which can effectively improve the high-temperature resistance and corrosion resistance of the material while ensuring the plasticity and toughness of the material. The HEA material also includes Al and Ti, which reduces the density of the material while promoting its oxidation resistance and hardness, thereby enabling the properties of light weight, high hardness, and high strength.

In an alternative embodiment, the HEA includes the following chemical components in atomic percentage: Fe: 22%, Co: 18%, Ni: 21%, Cr: 19%, Al: 9%, and Ti: 11%.

In a second aspect, an embodiment of the present disclosure also provides a preparation method of the HEA, including: using a plasma rotating electrode process to prepare an HEA powder.

In an alternative embodiment, the HEA powder is fabricated through the following steps: preparing a consumable electrode rod from raw materials, melting a surface of the consumable electrode rod with a plasma gun, spinning the rod under an action of high-speed rotary centrifugation to obtain tiny droplets, cooling the tiny droplets into a spherical powder, and collecting to obtain the HEA powder.

In an alternative embodiment, the HEA powder is prepared through the following steps:

in a plasma rotating electrode process device, the metal elements of Fe, Co, Cr, Ni, Al, and Ti are used as raw materials to prepare an HEA powder.

Step 1: According to the following atomic percentages: Fe: 15% to 25%, Co: 15% to 25%, Ni: 15% to 25%, Cr: 15% to 25%, Al: 5% to 15%, and Ti: 5% to 15%, ingots of each metal are taken, smelted, cooled, forged, and then processed into a consumable electrode rod for subsequent powder preparation.

Step 2: A working chamber is vacuumed and then introduced with high-purity argon to keep a pressure in the working chamber at a specified value.

Step 3: A high-speed rotation mechanism is started such that the consumable electrode rod rotates rapidly in an inert gas protective environment.

Step 4: A surface of the consumable electrode rod is melted with a plasma gun and spun under an action of high-speed rotary centrifugation to obtain tiny droplets, and the tiny droplets are cooled into a spherical powder and collected.

Step 5: The powder prepared in step 4 is poured into a powder storage bin for laser cladding of a surface.

Step 6: The powder in step 5 is sieved, and a resulting powder is dried in a vacuum drying oven.

In an alternative embodiment, the various metals in step 1 each have a purity of 99.00 wt. %.

In an alternative embodiment, the consumable electrode rod in step 1 has a diameter of 30 mm and a length of 150 mm.

In an alternative embodiment, the argon in step 2 has a purity of 99.999 vol. %.

In an alternative embodiment, a chamber pressure in the working chamber in step 2 is maintained at 0.04 MPa to 0.07 MPa.

In an alternative embodiment, the inert gas in step 3 is preferably argon or helium, with a purity of 99.99 vol. %.

In an alternative embodiment, the consumable electrode rod in step 3 rapidly rotates at a rotational speed of 16,000 r/min in an inert gas environment.

In an alternative embodiment, a flame temperature of the plasma gun in step 4 needs to be maintained at 1,650° C. or higher to ensure that the surface of the consumable electrode rod can be melted orderly.

In an alternative embodiment, the vacuum drying in step 6 is conducted at 100° C. to 150° C.

In an alternative embodiment, a vacuum negative pressure in step 6 is −0.08 MPa to −0.10 MPa.

In a third aspect, an embodiment of the present disclosure also provides use of the HEA in the preparation of an HEA coating or a HEA material block.

The HEA powder is preferably used for laser additive manufacturing to prepare an HEA coating and is more preferably used for laser cladding to prepare an HEA coating.

In a fourth aspect, the present disclosure also provides a preparation method of an HEA coating, including: using the HEA powder to prepare the HEA coating.

Preferably, a method for preparing the HEA coating is at least one selected from the group consisting of magnetron sputtering, EB-PVD, AIP, flame spray coating, atmospheric plasma spraying. VPS, cold spraying, PS-PVD, pulse plating, and laser cladding, is preferably laser additive manufacturing, and is more preferably laser cladding.

In an alternative embodiment, the laser cladding conducted to obtain the HEA coating includes the following steps: creating a series of target three-dimensional (3D) laser cladding coatings with a software, designing a laser cladding trajectory within a processing system, and manufacturing the high-performance cladding layer with the HEA powder.

Preferably, the HEA is a FeCoCrNiAl$_{0.5}$Ti$_{0.5}$ alloy, and the HEA includes the following chemical components in atomic percentage: Al: 10.01% to 12.30%, Co: 18.1% to 22.5%, Cr: 18.05% to 20.12%, Fe: 18.77% to 21.02%, Ni: 19.21% to 20.99%, and Ti: 8.43% to 11.5%;

preferably, the laser cladding is conducted with a laser power of 1,800 W to 2,400 W, a scanning speed of 300 mm/min to 800 mm/min, a lapping ratio of 50% to 70%, and a powder feeding speed of 4 rpm to 6 rpm;

preferably, an HEA powder suitable for the laser cladding has a particle size of 90 μm to 108 μm;

preferably, a software for the creating of 3D laser cladding coatings is UG, Solidworks, Pro/e, or CATIA;

preferably, the processing system is a programming software carried by a KUKA or ABB robot; and preferably, the laser cladding trajectory is obtained as follows: converting information in the 3D coatings into a plurality of slices, defining each slice as a cross-sectional layer of a component, and forming the target cladding layer by the above method.

In a fifth aspect, an embodiment of the present disclosure also provides a laser cladded coating prepared by laser cladding.

Preferably, when the substrate is AISI 45 steel, the laser cladding-formed coating metallurgically binds to the substrate, and has a microhardness as high as 700 to 770 HV$_{0.2}$ that is 2.3 to 2.5 times a microhardness of the substrate (AISI 45 steel) and an average wear rate of $5.21 \times 10^{-5}$ mm$^3$/(N·m) to $9.18 \times 10^{-5}$ mm$^3$/(N·m).

In a sixth aspect, an embodiment of the present disclosure also provides use of the laser cladded coating in a material with high hardness and wear resistance.

Preferably, the laser cladded coating is used for high hardness, and wear resistance materials of heavy load and large impact components in fields of stamping dies, petrochemical industry, marine engineering, and agricultural machinery.

More preferably, the laser cladded coating is used for a material with high hardness and wear resistance on a surface of a precision mold, an offshore engineering component, or a drilling rod.

The features and properties of the present disclosure are further described in detail below in conjunction with the examples.

Example 1

A FeCoCrNiAl$_{0.5}$Ti$_{0.5}$ HEA with high hardness and wear resistance and a preparation method thereof were provided. A powder of the HEA included the following chemical components in atomic percentage: Fe: 20.00%, Co: 21.00%, Ni: 20.99%, Cr: 19.01%, Al: 10.01%, and Ti: 8.99%.

The preparation method included the following steps:

Step 1: According to the following atomic percentages: Fe: 20.00%, Co: 21.00%, Ni: 20.99%, Cr: 19.01%, Al: 10.01%, and Ti: 8.99%, ingots of each metal were taken, smelted, cooled, forged, and then processed into a consumable electrode rod with a diameter of 30 mm and a length of 150 mm for subsequent powder preparation.

Step 2: A working chamber was vacuumed and then introduced with high-purity argon (99.999 vol. %) to keep a pressure in the working chamber at 0.06 MPa.

Step 3: A high-speed rotation mechanism was started such that the consumable electrode rod rapidly rotated at a rotational speed of 16,000 r/min in a high-purity argon (99.999 vol. %) environment.

Step 4: A surface of the consumable electrode rod was melted with a plasma gun at a flame temperature 1,650° C. or higher and spun under an action of high-speed rotary centrifugation to obtain tiny droplets, and the tiny droplets were cooled into a spherical powder and collected.

Step 5: The powder prepared in step 4 was poured into a powder storage bin for laser cladding of a surface.

Step 6: The powder obtained in step 5 was sieved to collect a spherical powder with a particle size of 90 μm to 108 μm, and the collected powder was dried for 2 h in a vacuum drying oven at a temperature of 120° C. and a vacuum degree of −0.1 MPa.

A method for preparing a high-performance cladding layer on a surface of a target cladded substrate was as follows:

Step 7: A target cladding substrate was subjected to 3D creating in Solidworks, a cladding trajectory was designed within the processing system, and a high-performance cladding layer was formed with the HEA powder in step 6.

In this example, a plasma rotating electrode process was used to prepare an HEA powder (a powder sample), then the prepared HEA powder was used to prepare an HEA coating (a cladding layer sample) on a surface of the target cladded substrate through laser cladding, and the prepared powder sample and cladding layer sample were tested for mechanical properties.

Figure 1:
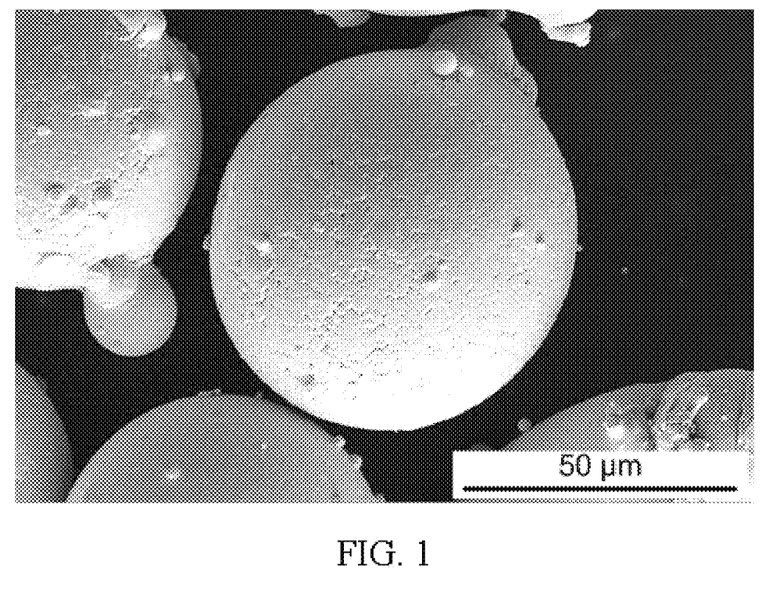
FIG. 1 is a scanning electron microscopy (SEM) image of the HEA powder $FeCoCrNiAl_{0.5}Ti_{0.5}$ in Example 1 of the present disclosure.

The appearance of the powder sample was subjected to SEM analysis. As shown in FIG. 1, the prepared HEA powder has high sphericity with few satellite spheres and coated spheres on the surface, and thus is suitable for laser cladding.

Figure 2:
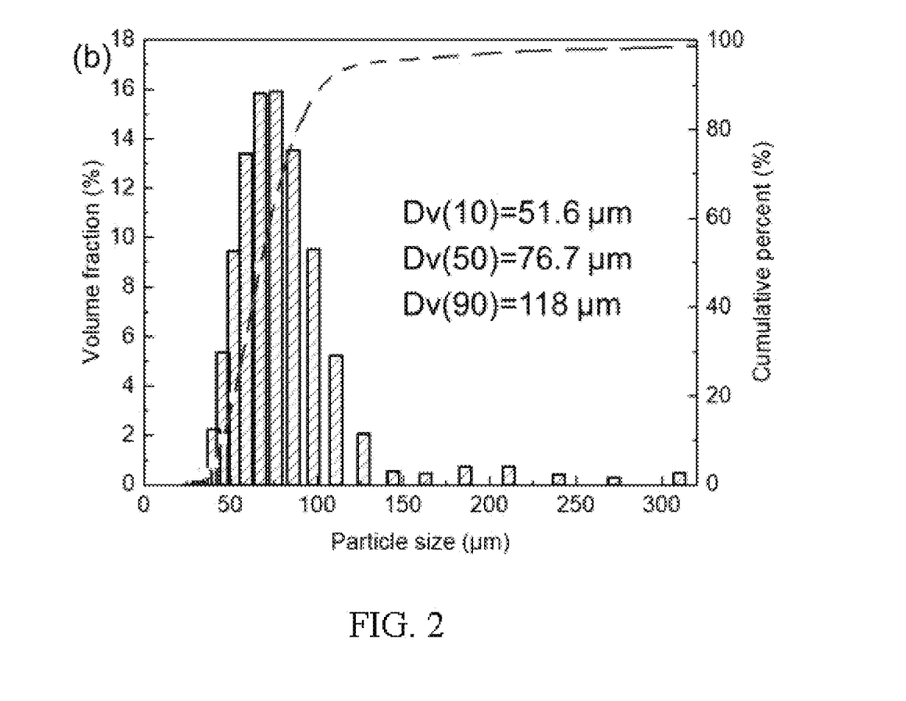
FIG. 2 shows a particle size distribution of the HEA powder $FeCoCrNiAl_{0.5}Ti_{0.5}$ in Example 1 of the present disclosure.

According to the GB/T 19077-2016 standard, a particle size distribution was measured with an MS3000 laser particle analyzer. As shown in FIG. 2, $D_v(50)$ was 76.7 μm, which met the common powder size range of 90 μm to 108 μm for laser cladding.

According to the GB/T 1482-2010 standard, the fluidity of the powder was measured with a JHY-1002 Hall flow meter to be 18.63 s/50 g, which met the requirements of a laser cladding process.

According to the GB/T 14265 standard, an oxygen content of the powder was determined to be 279 ppm, and the very low oxygen content was conducive to laser cladding forming.

Figure 3:
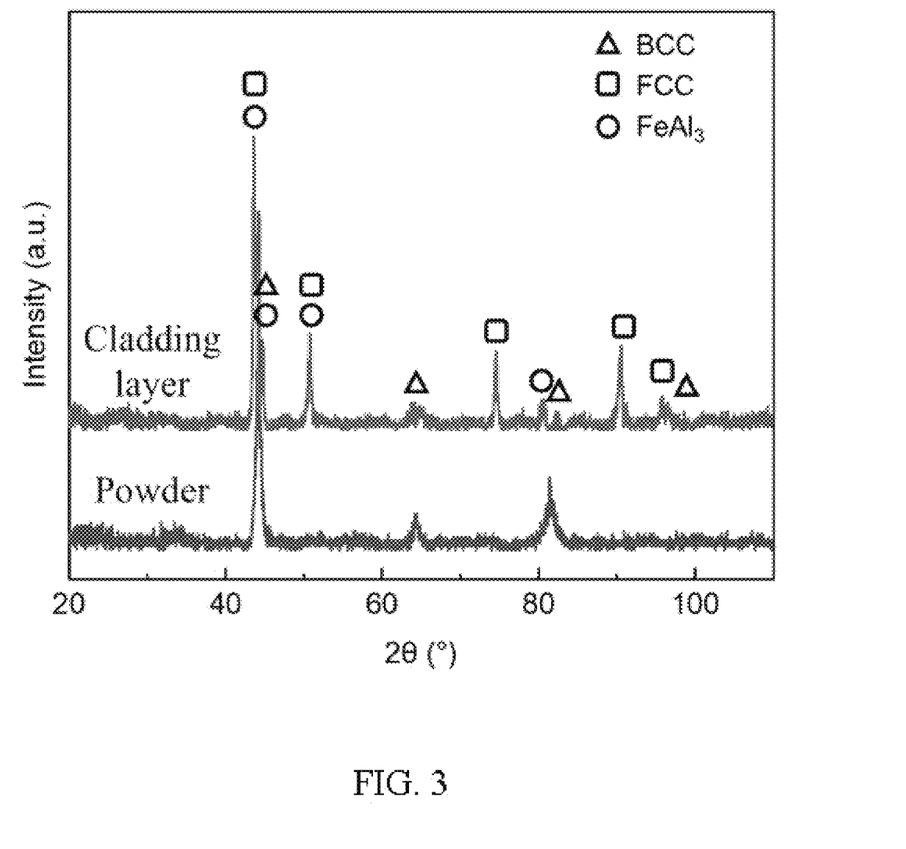
FIG. 3 shows X-ray diffraction (XRD) patterns of the HEA powder $FeCoCrNiAl_{0.5}Ti_{0.5}$ in Example 1 of the present disclosure and a corresponding laser cladded coating.

A TRUMPF TruDisk 6006 laser cladding device was used to conduct cladding with the prepared powder under the following key parameters: laser power: 2,200 W, scanning speed: 360 mm/min, lapping ratio: 50%, and powder feeding speed: 5 rpm. Compositions of the powder sample and the cladding layer sample were shown in FIG. 3. The powder and coatings were mainly composed of the BCC phase with high hardness, and the cladding layer was composed of BCC and FCC phases containing a small amount of a $FeAl_3$ intermetallic compound. This is because an ordered phase of the Al-rich intermetallic compound was formed during the melting, resulting in the transformation of the original HEA lattice. It could be known through multiple measurements that an average microhardness of the cladding layer could reach 726.23 $HV_{0.2}$.

Figure 4:
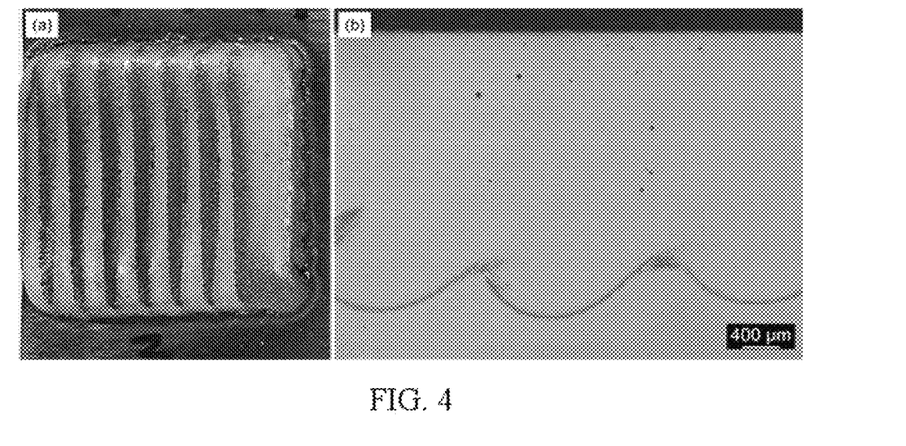
FIG. 4 shows the $FeCoCrNiAl_{0.5}Ti_{0.5}$ HEA coating formed through laser cladding in Example 1 of the present disclosure, where a shows the surface morphology and b shows the cross-sectional morphology.

FIG. 4 shows morphology images of the cladding layer sample, where a shows the surface morphology and b shows the cross-sectional morphology. It can be seen from the figure that the surface and cross section of the cladding layer sample are intact and crack-free.

Figure 5:
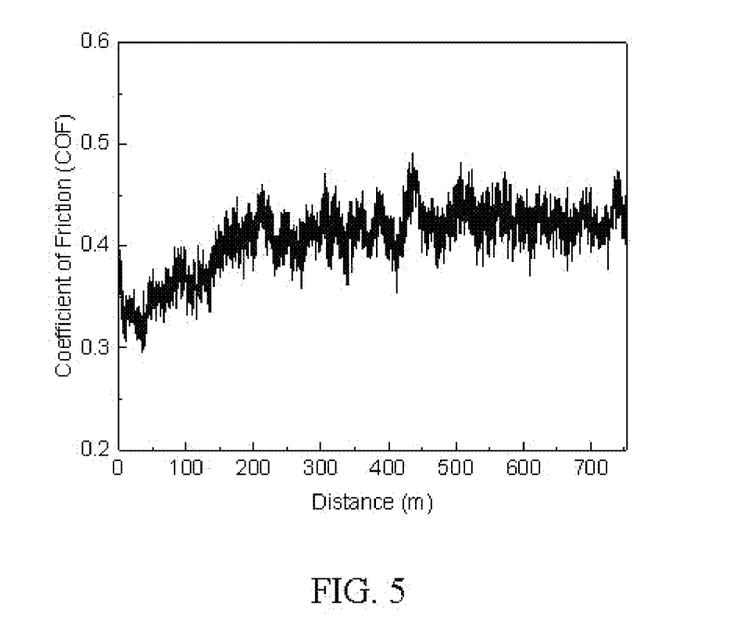
FIG. 5 shows a coefficient of friction (COF)-distance curve of the $FeCoCrNiAl_{0.5}Ti_{0.5}$ HEA coating formed through laser cladding in Example 1 of the present disclosure.

FIG. 5 shows a COF-distance curve of the cladding layer sample. A wear test was conducted under the following specific test conditions: load: 1,000 g, rotational speed: 400 rpm, friction distance: 753.5 m, friction radius: 5 mm, friction time: 60 min, and friction ball: $Si_3N_4$. Test results showed that an average wear rate was $9.22 \times 10^{-5}$ mm$^3$/(N·m) and an average COF was 0.42.

Example 2

An HEA powder was provided, including the following metal elements in atomic percentage: Fc: 21.02%, Co: 22.50%, Ni: 19.99%, Cr: 18.05%, Al: 10.01%, and Ti: 8.43%. The powder preparation and cladding process parameters were substantially consistent with the key parameters provided in Example 1.

A cladding layer sample was prepared from the alloy material through laser cladding, and the prepared powder sample and cladding layer sample were tested for mechanical properties.

According to the GB/T 19077-2016 standard, a particle size distribution was measured with an MS3000 laser particle analyzer, and it was known that $D_v(10)$=46.1 μm, $D_v(50)$=71.7 μm, and $D_v(90)$=111 μm, which met the common powder size range of 90 μm to 108 μm for laser cladding.

According to the GB/T 1482-2010 standard, with a JHY-1002 Hall flow meter, the fluidity of the powder was measured to be 21.32 s/50 g and the loosening density was measured to be 3.89 g/cm$^3$, which met the requirements of a laser cladding process.

According to the GB/T 14265 standard, an oxygen content of the powder was determined to be 232 ppm and a nitrogen content of the powder was determined to be 65 ppm; and the very low oxygen/nitrogen content was conducive to laser cladding forming.

It could be known through multiple measurements that an average microhardness of the cladding layer could reach 706.08 $HV_{0.2}$. A wear test was conducted under the following specific test conditions: load: 1,000 g, rotational speed: 400 rpm, friction distance: 753.5 m, friction radius: 5 mm, friction time: 60 min, and friction ball: $Si_3N_4$. Test results showed that an average COF was 0.41 and an average wear rate was $8.57 \times 10^{-5}$ mm$^3$/(N·m).

Example 3

An HEA powder was provided, including the following chemical components in atomic percentage: Fe: 18.77%, Co: 18.10%, Ni: 19.21%, Cr: 20.12%, Al: 12.30%, and Ti: 11.50%. The powder preparation and cladding process parameters were substantially consistent with the key parameters provided in Example 1.

A cladding layer sample was prepared from the alloy material through laser cladding, and the prepared powder sample and cladding layer sample were tested for mechanical properties.

According to the GB/T 19077-2016 standard, a particle size distribution was measured with an MS3000 laser particle analyzer, and it was known that $D_v(10)$=42.5 μm, $D_v(50)$=68.1 μm, and $D_v(90)$=105 μm, which met the common powder size range of 90 μm to 108 μm for laser cladding.

According to the GB/T 1482-2010 standard, with a JHY-1002 Hall flow meter, the fluidity of the powder was measured to be 26.30 s/50 g and the loosening density was measured to be 3.86 g/cm$^3$, which met the requirements of a laser cladding process.

According to the GB/T 14265 standard, an oxygen content of the powder was determined to be 181 ppm and a nitrogen content of the powder was determined to be 52 ppm; and the very low oxygen/nitrogen content was conducive to laser cladding forming.

It could be known through multiple measurements that an average microhardness of the cladding layer could reach 768.21 $HV_{0.2}$. A wear test was conducted under the following specific test conditions: load: 1,000 g, rotational speed: 400 rpm, friction distance: 753.5 m, friction radius: 5 mm, friction time: 60 min, and friction ball: $Si_3N_4$. Test results showed that an average COF was 0.38 and an average wear rate was $5.23 \times 10^{-5}$ mm$^3$/(N·m).

Compared with other HEAs with similar properties, the HEA provided in the examples of the present disclosure have simple preparation, low cost, uniform organization, and excellent weldability, and thus are special additive manufacturing materials suitable for laser cladding. The specific comparison results were as follows:

Comparative Example 1

An HEA coating and a preparation method and use thereof were provided (publication No. CN 107299342 A). The HEA coating provided in Comparative Example 1 was composed of Fe, Co, Cr, Ni, Si, Al, and Ti in a molar ratio of 1:1:1:1:1:(0.5-1.5):(0-1). Compared with the HEAs provided in the examples of the present disclosure, the HEA provided in Comparative Example 1 further included Si, which increased the hardness of the HEA powder, but also increased the brittleness of the HEA coating, resulting in the increased possibility of cracking. The HEA powder provided in Comparative Example 1 was prepared by mixing different required elemental powders and acquiring the target cladding powder via a ball-milling method. Thus, the powder chemical compositions were extremely inhomogeneous so that the microstructure distribution of the cladding layer demonstrated a segregation phenomenon and the performance of the cladding layer was quite deteriorated. In addition, the HEA powder provided in Comparative Example 1 was pre-applied to the workpiece surface with a binder, and then laser cladding was conducted, such that a large number of holes would be formed due to the volatilization of the low-melting-point organic matter, further reducing the quality of the coating while increasing the cladding operation procedures.

Comparative Example 2

An alloy composition was disclosed in "An HEA solid wire for arc cladding and a preparation method thereof" (publication No. CN 109234601A). The HEA solid wire provided in Comparative Example 2 was composed of Co, Cr, Fe, Mn, Ni, and Er in a molar ratio of 19:19:19:19:19:(2-4). Compared with the HEA provided in the examples of the present disclosure, the HEA solid wire provided in Comparative Example 2 further included the rare earth element erbium (Er). Although the rare earth element can improve the plasticity of a coating, Er is a strategic resource which is difficult to be smelted and prepared and not cost-friendly, and thus is not suitable for large-scale promotion. In the case of a similar hardness, such a rare earth element Er is not required in the HEAs provided in the examples of the present disclosure. Further, a powder of the HEA solid wire provided in Comparative Example 2 was obtained by mixing different elemental powders and collecting a resulting mixture using an high-energy ball-milling method, which resulted in non-uniform material composition, microstructure and properties. The HEA in the examples of the present disclosure was a spherical powder with a low oxygen content prepared by the plasma rotating electrode process, and was a special additive manufacturing powder suitable for laser cladding. In addition, a series of procedures including ball milling-jetting-cryogenic cooling-extrusion-wire drawing of the HEA solid wire provided in Comparative Example 2 to prepare an HEA were extremely cumbersome. The HEA in the examples of the present disclosure was manufactured from the novel HEA powder by the plasma rotating electrode process, which had the excellent advantage of simple acquisition.

Comparative Example 3

An HEA powder was provided, including the following metal elements in atomic percentage: Fe: 27.34%, Co: 20.99%, Ni: 12.50%, Cr: 20.68%, Al: 7.11%, and Ti: 11.38%. The powder preparation and cladding process parameters were substantially consistent with the key parameters provided in Example 1. With the sharp reduction in Ni content (less than 15% of the designed value), the toughness and weldability of the powder material were reduced.

Figure 6:
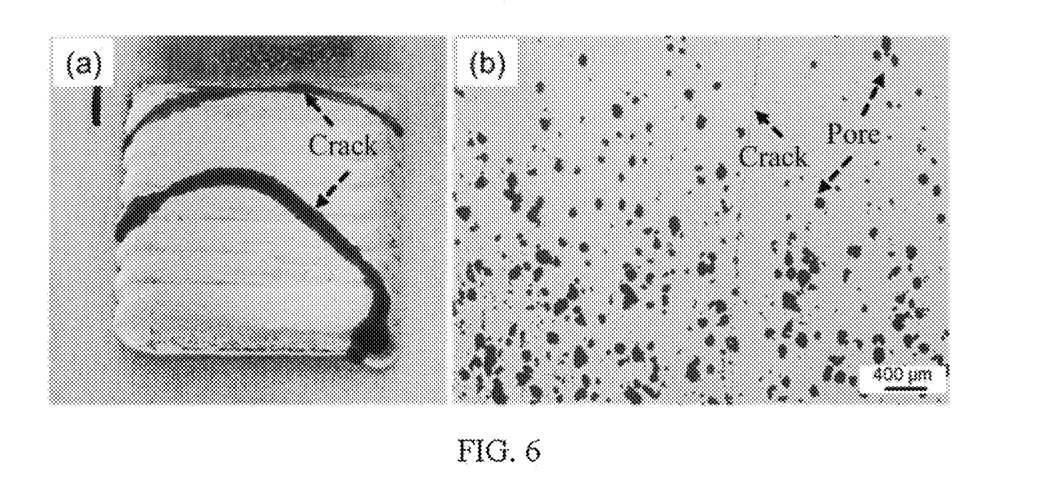
FIG. 6 shows the $FeCoCrNiAl_{0.5}Ti_{0.5}$ HEA coating formed through laser cladding in Comparative Example 3 of the present disclosure, where a shows the surface morphology and b shows the microcrack and pore distribution.

As shown in a of FIG. 6, penetrating cracks appear on the surface of the cladding material. As shown in b of FIG. 6, there are also a large number of microcracks and micropores inside the cladding layer, which greatly reduces the mechanical properties of the cladding layer and is not conducive to the surface strengthening and repair of the laser cladding coating, indicating that the HEA powder of this composition is not suitable for laser cladding.

Comparative Example 4

An HEA powder was provided, including the following metal elements in atomic percentage: Fe: 23.03%, Co: 18.32%, Ni: 19.57%, Cr: 24.69%, Al: 4.95%, and Ti: 9.43%. The powder preparation and cladding process parameters were consistent with the key parameters provided in Example 1. Since a content of Al in the powder is lower than the designed value, the Al undergoes significant burnout during the laser cladding process, such that the content of the intermetallic compound with high hardness such as $FeAl_3$ is sharply decreased, the hardness after cladding is reduced to 450 $HV_{0.2}$, the corresponding average wear rate is increased to $16.7\times10^{-5}$ mm$^3$/(N·m), and the average COF is 0.50, which heavily compromises the final quality of the cladding layer and is not conducive to the surface strengthening of the laser cladding layer. It indicates that the HEA powder of this composition is not suitable for laser cladding.

Comparative Example 5

Figure 7:
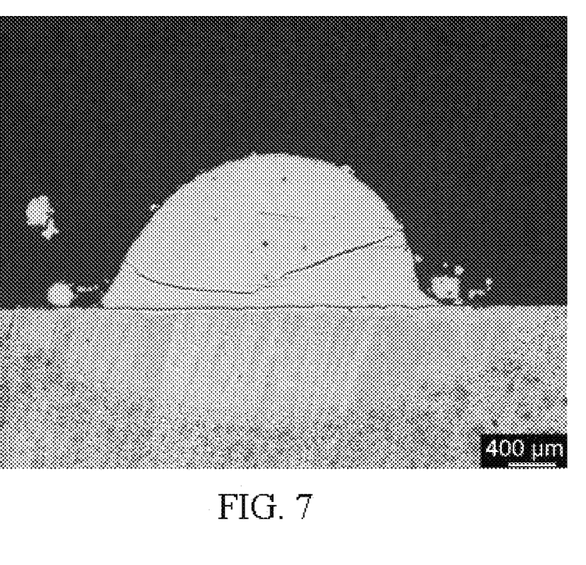
FIG. 7 is a cross-sectional view of a low-power, single-track cladding layer of the HEA in Comparative Example 5 of the present disclosure.

An HEA powder was provided, including the following metal elements in atomic percentage: Fe: 20.00%, Co: 21.00%, Ni: 20.99%, Cr: 19.01%, Al: 10.01%, and Ti: 8.99%. The powder composition and the powder preparation process were consistent with the key parameters provided in Example 1, except that only the laser power among the cladding parameters was changed to 1,400 W and the cladding layer underwent serious cracking (as shown in FIG. 7). A reason for the above situation is as follows: Although the input laser energy is enough to melt the HEA powder, there is an inherent hard phase and a residual stress therein is extremely large, which eventually leads to cracking of a cladding layer after solidification. It indicates that different experimental factors will affect the microstructure and performance of a coating and the changes of the test protocol will have a significant impact on the product of the present disclosure. Therefore, the parameter scheme recommended by the present disclosure is required by the powder.

Thus, after considering the different service conditions, material selections, and material properties, a series of designs were conducted for the special HEA powder for additive manufacturing and the corresponding coatings were prepared. Compared with some HEAs with complicated compositions, the HEA provided in the examples of the present disclosure was composed of 6 elements including Fe, Co, Ni, Cr. Al, and Ti, and the provided HEA included the following chemical components in atomic percentage: Fe: 15% to 25%, Co: 15% to 25%, Ni: 15% to 25%, Cr: 15% to 25%, Al: 5% to 15%, and Ti: 5% to 15%. The HEA powder prepared by the plasma rotating electrode atomization milling technology has excellent physical properties such as sphericity, particle size distribution, fluidity, and oxygen/nitrogen content, which is conducive to laser cladding. A corresponding HEA coating with high strength, high hardness, and prominent wear resistance can be prepared through laser cladding. The provided laser cladded coating is suitable for materials with heavy load-bearing, large impact, high hardness, and wear resistance in the fields of stamping dies, petrochemical industry, marine engineering, and agricultural machinery, and especially can meet the use conditions in terms of materials and structures for precision molds, key offshore components, and drilling rods, which has high practical values and significant promotion significance.

In summary, an embodiment of the present disclosure provides an HEA, and a preparation method and laser cladding method thereof. The HEA includes the following chemical components in atomic percentage: Fe: 15% to 25%, Co: 15% to 25%, Ni: 15% to 25%, Cr: 15% to 25%, Al: 5% to 15%, and Ti: 5% to 15%. The HEA material with high hardness and wear resistance of the present disclosure is suitable for laser cladding on a surface of a precision mold, an offshore engineering component, or a drilling rod. The present disclosure also provides a preparation method of the HEA material with high hardness and wear resistance. A powder is prepared from the above alloy components and then prepared into a corresponding HEA coating with high strength, high hardness, and prominent wear resistance through laser cladding. In addition, the material has prominent weldability and is a special HEA material suitable for laser additive manufacturing.

Compared with the prior art, the technical solutions provided in the embodiments of the present disclosure have the following beneficial effects:

(1) The HEA material provided in an embodiment of the present disclosure includes Ni and Co that have excellent toughness and prominent high-temperature resistance, which can effectively improve the high-temperature resistance and corrosion resistance of the material while ensuring the plastic toughness of the material.

(2) The HEA material provided in an embodiment of the present disclosure also includes Al and Ti, which reduces the density of the material while promoting the oxidation resistance and hardness of the material, thereby enabling the properties of light weight, high hardness, and high strength.

(3) The HEA material provided in an embodiment of the present disclosure is a special HEA powder material that has excellent weldability and is suitable for laser additive manufacturing, which expands a use scope of the material in the field of additive manufacturing.

The above examples are merely preferred examples of the present disclosure and are not intended to limit the present disclosure, and various changes and modifications may be made to the present disclosure by those skilled in the art. Any modifications, equivalent substitutions, improvements, and the like made within the spirit and principle of the present disclosure should be included within the protection scope of the present disclosure.

The invention claimed is:

1. A preparation method of a high-entropy alloy (HEA) coating on a precision mold, an offshore component, or a drilling rod, comprising: conducting laser cladding with an HEA powder on a surface of the precision mold, the offshore component, or the drilling rod to obtain the HEA coating;
wherein the HEA is a FeCoCrNiAl$_{0.5}$Ti$_{0.5}$ alloy, and the HEA comprises the following chemical components in atomic percentage: Al: 10.01% to 12.30%, Co: 18.1% to 22.5%, Cr: 18.05% to 20.12%, Fe: 18.77% to 21.02%, Ni: 19.21% to 20.99%, and Ti: 8.43% to 11.5%;
the laser cladding is conducted with a laser power of 1,800 W to 2,400 W, a scanning speed of 300 mm/min to 800 mm/min, an overlap rate of 50% to 70%, and a powder feeding speed of 4 rpm to 6 rpm;
the HEA powder suitable for the laser cladding has a particle size of 90 μm to 108 μm; and
the HEA powder is fabricated through the following steps: forging a consumable electrode rod from raw materials, melting a surface of the consumable electrode rod with a plasma gun, while spinning the rod under centrifugation to obtain tiny droplets, cooling the tiny droplets into a spherical powder, and collecting to acquire the HEA powder, wherein the plasma gun is used for melting with a flame temperature of the plasma gun maintained at 1,650° C. or higher.

2. The preparation method according to claim 1, wherein the HEA powder is prepared through the following steps:
in a plasma rotating electrode process device, taking metal ingots of Fe, Co, Cr, Ni, Al, and Ti as raw materials according to composition and ratio of the HEA, melting the ingots, cooling, and forging to obtain the consumable electrode rod;
vacuuming a working chamber of the plasma rotating electrode process device, and introducing the working chamber with a high-purity argon;
running rotation equipment to make the consumable electrode rod rotate rapidly in an inert gas environment; and
melting the surface of the consumable electrode rod with a plasma gun, spinning the rod under centrifugation of the rotation equipment to obtain tiny droplets, cooling the tiny droplets into a spherical powder, and collecting, sieving, and drying the spherical powder.

3. The preparation method according to claim 2, wherein the metal ingots of Fe, Co, Cr, Ni, Al, and Ti have a purity of 99.00 wt. %.

4. The preparation method according to claim 2, wherein a pressure in the working chamber of the plasma rotating electrode process device is maintained at 0.04 MPa to 0.07 MPa.

5. The preparation method according to claim 2, wherein the spherical powder is vacuum-dried at a temperature of 100° C. to 150° C. and a negative pressure of -0.08 MPa to -0.10 MPa.

6. The preparation method according to claim 1, wherein the conducting laser cladding to obtain the HEA coating comprises the following steps: creating a series of target three-dimensional (3D) laser cladding coatings with a software, designing a laser cladding trajectory within a processing system, and manufacturing the high-performance cladding layer with the HEA powder.

7. The preparation method according to claim 6, wherein the software for the creating of 3D laser cladding coatings is UG, Solidworks, Pro/e, or CATIA.

8. The preparation method according to claim 6, wherein the processing system is a programming software carried by a KUKA or ABB robot.

9. The preparation method according to claim 6, wherein the laser cladding trajectory is designed by converting information in a 3D model into a plurality of slices, and defining each slice as a cross-sectional layer of a component, and forming the target tracks and layers via the laser cladding method.

10. A laser cladded coating prepared by the preparation method according to claim 6, wherein when the target cladding substrate is AISI 45 steel, the laser cladded coating metallurgically binds to the substrate, and has a microhardness as high as 700 to 770 $HV_{0.2}$ that is 2.3 to 2.5 times a microhardness of the substrate and an average wear rate of $5.21 \times 10^{-5}$ mm$^3$/(N·m) to $9.18 \times 10^{-5}$ mm$^3$/(N·m).

\* \* \* \* \*